Dec. 22, 1936.  H. M. JENSEN  2,064,917
NAVAGATIONAL INSTRUMENT
Filed June 6, 1934  2 Sheets-Sheet 1

INVENTOR
HENRY M. JENSEN
BY
Harold Dodd
ATTORNEY

Dec. 22, 1936.   H. M. JENSEN   2,064,917
NAVAGATIONAL INSTRUMENT
Filed June 6, 1934   2 Sheets-Sheet 2

INVENTOR
HENRY M. JENSEN
BY
ATTORNEY

Patented Dec. 22, 1936

2,064,917

UNITED STATES PATENT OFFICE 2,064,917

NAVIGATIONAL INSTRUMENT

Henry M. Jensen, United States Navy

Application June 6, 1934, Serial No. 729,256

4 Claims. (Cl. 235—83)

(Granted under the act of March 3, 1883, as amended April 30, 1928; 370 O. G. 757)

This invention relates to navigational instruments, and more particularly to an instrument for determining the correction to be applied to an observed altitude of Polaris when that star is being used in the determination of the latitude of the observer's position.

Applicant is aware that instruments have previously been constructed for such a purpose but all such prior instruments of which he has knowledge employ a plurality of disks, scales, and pointers or arms adapted to move over these scales. Applicant, by a novel arrangement, has made it possible to ascertain such data by the use of one movable disk rotatable on a suitable base and one semi-fixed arm or pointer. This reduces the number of adjustments to be made to one and does away with a movable pointer that is apt, not only to slip, but also to catch on the papers and charts that are usually spread out on the navigator's work table.

In the form in which the invention is herein disclosed, it is shown as being especially adapted to the star finder and identifier as disclosed in United States Letters Patent No. 1,401,446 to Rude as modified by applicant's joint Patent No. 1,919,222 issued to Henry M. Jensen, John E. Gingrich and Guillermo Medina. The present invention, when incorporated in the star finder of Rude Patent No. 1,401,440 as modified by Jensen et al., permits the quick determination of the correction to be applied to an observed altitude of Polaris for determining the latitude of the observer's position without reference to other books or instruments.

In ordinarily determining latitude by observations of Polaris, two observations are taken; the altitude of the star and the civil time of the obsevation. This latter time is converted to local sidereal time and then by entering a table in the Nautical Almanac, using the local sidereal time as an argument, a correction is found which, when algebraically applied to the observed altitude, results in the observer's true latitude.

An object of this invention, therefore, is to provide a ready means for determining the altitude correction necessary in the determination of latitude of the observer's position by observations of Polaris without reference to other instruments or tables.

A further object is the adaptation of this invention to the instrument fully described in applicant's joint Patent No. 1,919,222 whereby, for any instant of civil time, the corresponding local sidereal time and Polaris altitude correction may be readily determined from one setting of the instrument.

With the above and other objects in view, this invention consists of such construction and arrangement of parts as will be more fully described hereinafter in connection with the accompanying drawings, in which.

Figure 4:
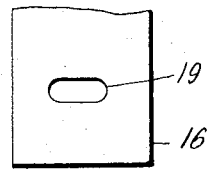
Fig. 4 is an enlarged view of the end of the arm or pointer.

In the form shown, the framework 10 is made of heavy cardboard or other suitable material, and has glued or othewise secured to it a covering of heavy paper 11, such as chart paper or other suitable material, upon which is marked the date scale 13. Pivoted at the center of the date scale is a disk 14 of heavy paper or other suitable material, which has marked at the outer circumference thereof, an hour scale 15, from 0 to 24 hours. The radius of the disk is such that it overlaps the edge of, but does not cover, the date scale. This facilitates the adjustment of any particular point on the hour scale to a particular point on the date scale. Also, pivoted at the center of the date scale and the disk is an arm 16 made of transparent material, bearing a longitudinal median line 22, graduated in degrees to represent both declination and latitude. For the northern hemisphere, the graduations are marked from the celestial equator towards the pivot from 0° to 85° north, and from the celestial equator away from the pivot from 0° to 70° south. The disk 14 and arm 16 are pivoted on a hollow, internally threaded rivet 17 into which is screwed a flat headed screw 18. The outer end of the arm 16 has an elongated opening 19 (Fig. 4) through which passes a rivet 20 and screw 21, similar to those described above, which are for the purpose of securing the arm in a desired position. The elongation of the slot permits the adjustments for the annual cyclic difference between civil and sidereal time that are required as described in my previously mentioned joint Patent No. 1,919,222.

On the disk 14, the navigational stars are located in accordance with their respective right ascensions as indicated on the hour scale 15, and their respective declinations as indicated on arm 16. The representation of these navigational stars on disk 14 is for the purposes described in Patent No. 1,401,446 to Rude and my joint Patent No. 1,919,222. Also, for convenience in estimating the approximate declination of the stars shown, a circle corresponding to the celestial equator is inscribed on disk 14.

As described in the previously mentioned joint patent, by setting hour scale 15 so that the civil time of observation is brought opposite the proper date, the local sidereal time of observation is shown on hour scale 15 under the longitudinal median line of arm 16. In ordinary practice, using the local sidereal time thus obtained as an argument in Table 1 of the American Nautical Almanac, the desired correction to the observed altitude could be obtained. However, on disk 14 is inscribed a curve 23, which curve is graduated in minutes and degrees of plus and minus correction, running from 0° to 1° 03.1' plus correction and 0° to 1° 03.1' minus correction. For any given local sidereal time to which disk 14 and hour scale 15 is set, the corresponding altitude correction is observed at the intersection of the curve 23 with the longitudinal median line 22 of arm 16. The value, plus or minus, may be read either from the graduations on curve 23 or from the graduations on arm 16 where, for this purpose, the degrees of declination marked thereon are to be read as minutes of arc denoting the desired correction. In reading from the arm, values read below the zero are to be taken as minutes of arc of minus correction, while values above the zero are for plus correction. Algebraically applying the correction obtained to the observed altitude of Polaris gives the true latitude of the observer's position at the time of observation.

From the above description, it is obvious that curve 23 is obtained in the reverse manner. For the latter purpose, a large disk 14 and a large, carefully graduated arm 16 is used. As the disk is turned under the meridian line 22 on arm 16, the altitude correction for each minute of local sidereal time, as obtained from Table I in the American Ephemeris for 1933, is carefully marked on disk 14 from which marks are constructed the curve 23 and graduations as shown. This large drawing is then photostatically reduced, lithographed and printed in usable form.

Figures 1, 2:
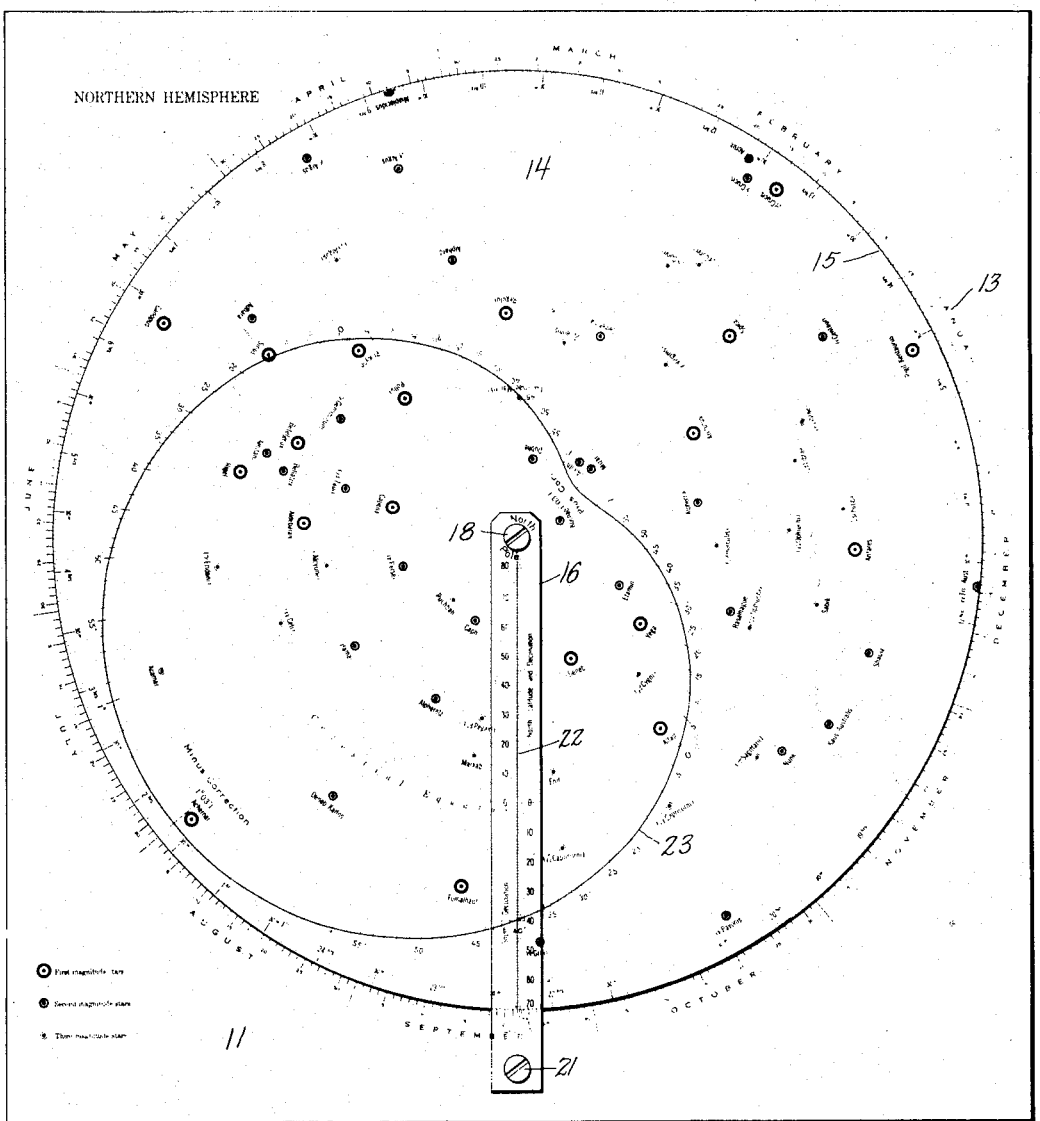
Fig. 1 is a plan view of the instrument showing a disk on which is inscribed a curve of corrections.
Fig. 2 is a section through a portion of the instrument and the arm or pointer.
Figure 3:
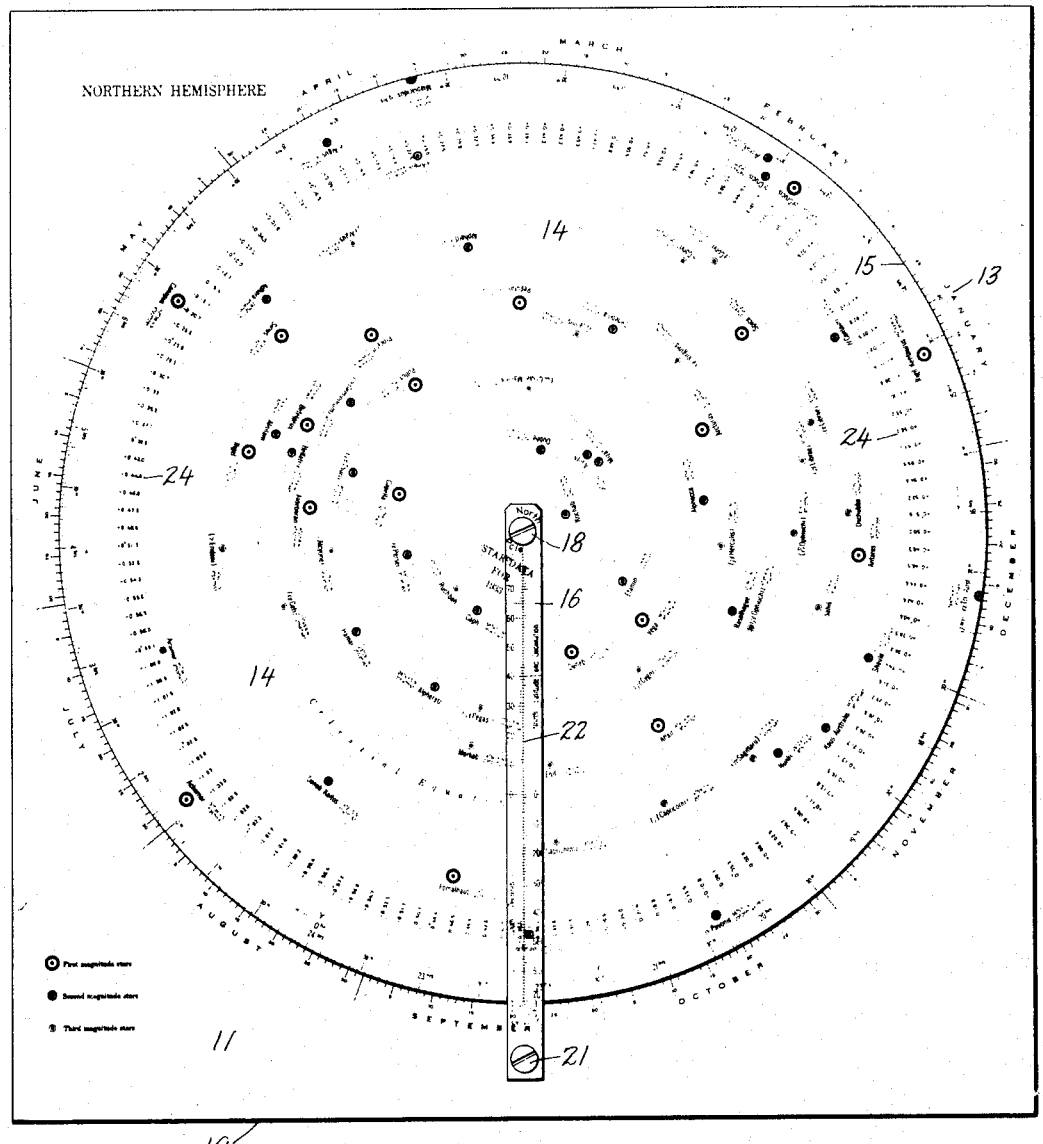
Fig. 3 is a plan view of the instrument showing a disk on which is printed an annular ring of tabulated corrections.

Referring to Fig. 3, the observed altitude corrections, as taken for each five minutes of local sidereal time from Table I, American Ephemeris, are inscribed in an annular ring 24 on disk 14. Thus, as the local sidereal time is found under the median line 22 of arm 16, the correction for the observed altitude of Polaris is taken from ring 24 also with respect to said median line. As each value given is for five minutes of time, interpolation must be used to obtain intermediate values of the correction.

The value of the correction thus found, plus or minus as the case may be, is then algebraically added to the observed altitude of Polaris to determine the true latitude of the observer's position. Thus, the unique and ingenious features of this invention facilitate and render more accurate the daily work of the navigator at sea.

It will be understood that the above description and accompanying drawings comprehend only the general and preferred embodiments of my invention, and that various changes may be made therein within the scope of the appended claims without sacrificing any of the advantages of this invention.

The invention described herein may be manufactured and used by or for the Government of the United States of America for governmental purposes without the payment of any royalty thereon.

I claim:

1. A navigational instrument, comprising a base upon which is graduated a date scale, a disk pivoted at the center of said date scale and having graduated on its edge an hour scale, said hour scale being associated with said date scale to facilitate the adjustment of one in relation to the other, said disk having located thereon a closed curve of corrections for observed altitudes of Polaris and a semi-permanently fixed arm pivoted at the center of said date scale and extending beyond the edge of said disk, said arm having a graduated median line for indicating, by its intersection with said curve, the correction to be applied to the observed altitude of Polaris to determine the true latitude of the observer's position, the value of said correction being read from said graduated median line, said correction being related to the sidereal time of observation.

2. A navigational instrument, comprising a base upon which is graduated a date scale, a disk pivoted at the center of said date scale and having graduated on its edge an hour scale, said hour scale being associated with said date scale to facilitate the adjustment of one in relation to the other, said disk having located thereon a graduated closed curve of corrections for observed altitudes of Polaris, said graduations being in degrees and minutes of arc, and a semi-permanently fixed arm pivoted at the center of said date scale and extending beyond the edge of said disk, said arm having a median line for indicating on said hour scale the corresponding sidereal time for any particular adjustment of the hour scale in relation to the date scale and by the intersection of said median line with said graduated curve indicating the correction to be algebraically applied to an observed altitude of Polaris to determine the true latitude of the observer's position, said correction corresponding to said sidereal time.

3. A navigational instrument, comprising a base upon which is graduated a date scale, a disk pivoted at the center of said date scale and having graduated on its edge an hour scale, said hour scale being associated with said date scale to facilitate the adjustment of one in relation to the other, said disk having located thereon a closed curve of corrections for observed altitudes of Polaris, an arm pivotally attached at the center of said date scale and extending beyond the edge of said disk, and means for adjustably securing said arm in a desired position, the said arm having a graduated median line for indicating, by its intersection with said curve, the correction to be applied to the observed altitude of Polaris, said correction being related to the sidereal time of observation indicated by the intersection of said median line with said hour scale.

4. A navigational instrument, comprising a base upon which is graduated a date scale, a disk pivoted at the center of said date scale and having graduated on its edge an hour scale, said hour scale being associated with said date scale to facilitate the adjustment of one in relation to the other, said disk having located thereon a closed curve of corrections for observed altitudes of Polaris and a semi-permanently fixed arm pivoted at the center of said date scale and extending beyond the edge of said disk, said arm having a graduated median line for indicating, by its intersection with said curve, the correction to be applied to the observed altitude of Polaris, said correction being related to the sidereal time of observation indicated by the intersection of said median line with said hour scale.

HENRY M. JENSEN.